United States Patent [19]

Labedz et al.

[11] Patent Number: 5,740,530

[45] Date of Patent: Apr. 14, 1998

[54] RAPID RECEIVED SIGNAL STRENGTH INDICATION

[75] Inventors: Gerald Paul Labedz, Chicago; Duane C. Rabe, Rolling Meadows, both of Ill.

[73] Assignee: Motorola, Inc., Schaumburg, Ill.

[21] Appl. No.: 890,320

[22] Filed: May 26, 1992

Related U.S. Application Data

[63] Continuation of Ser. No. 644,423, Jan. 22, 1991, abandoned, which is a continuation of Ser. No. 358,325, May 26, 1989, abandoned.

[51] Int. Cl.$^6$ ...................................................... H04Q 7/20
[52] U.S. Cl. ........................... 455/403; 455/138; 342/432
[58] Field of Search .............................. 379/58; 455/42, 455/52, 138, 205; 375/13, 14, 52; 342/432; 340/825.44; 332/105

[56] References Cited

U.S. PATENT DOCUMENTS

| | | | |
|---|---|---|---|
| 3,766,477 | 10/1973 | Cook | 455/42 |
| 3,815,028 | 6/1974 | Rabow | 455/138 |
| 4,718,081 | 1/1988 | Brenig | 379/60 |
| 4,881,028 | 11/1989 | Graziano | 342/432 |
| 4,893,347 | 1/1990 | Eastmond et al. | 455/52 |
| 4,918,437 | 4/1990 | Jasinski et al. | 340/825.44 |
| 5,115,514 | 5/1992 | Leslie | 455/9 |

OTHER PUBLICATIONS

Peebles, "Probability Random, Variables, and Random Signal Principles" 1980 McGraw–Hill Book Corp. pp. 132–139.

Taub, Schilling "Principles of Communication Systems" 1986 McGraw–Hill Book Company, pp. 411–419, 422–427, 436–437.

Proakis, Manolakis "Introduction to Digital Signal Processing" 1988 Macmillian Publishing Company, pp. 41–45, 125–129.

Activities of the COST 207 Working Group on Propagation, R. W. Lorenz—Forschungsinstitut der Deutschen Bundespost, Postfach 5000, D–6100 Darmstadt, Federal Republic of Germany.

*Primary Examiner*—William Cumming
*Attorney, Agent, or Firm*—Richard A. Sonnentag; John F. Motsinger

[57] ABSTRACT

There is provided a method of rapid Received Signal Strength Indication (RSSI) of a time-dispersed signal having echoes (where the time dispersal represents a significant fraction or more of the transmitted symbol interval). It comprises a sliding correlation of a received signal against a known sequence or via channel sounding to obtain the time-dispersal function of the communications channel upon which the signal is transmitted and a summation of the squares of the quadrature components of the energies at relative maxima of the correlations (correlation peaks determined with reference to a threshold level) to integrate the energy defined by the correlation function to determine the energy present among the time-dispersed echoes utilizing the time-dispersal function. Thus, the energy present in the time-dispersed echoes is related to the received signal strength, the RSSI comprises a scalar of the energy present and the scalar comprises a function of the receiver's gain, RSSI determinations during any given interval are less dependent upon the ambulatory velocity of the receiver, and RSSI determinations of equivalent accuracy are obtained more rapidly or more accurate RSSI determinations are obtained per unit time.

15 Claims, 3 Drawing Sheets

RAPID RECEIVED SIGNAL STRENGTH INDICATION

This is a continuation of application Ser. No. 07/644,423, filed on Jan. 22, 1991, now abandoned, which is a continuation of application Ser. No. 07/358,325, filed May 26, 1989, and now abandoned.

FIELD OF INVENTION

The present invention relates to rapid received signal strength indication. More particularly, the present invention relates to a method of rapid Received Signal Strength Indication (RSSI) of a time-dispersed signal having echoes. That is, the signal arriving at the receiver can be considered to be made up of the energy of the transmitted signal having been broken into many pans, each pan of the energy having taken a different path to the receiver and hence arriving at different times. The range of these times is one way of describing the delay spread. In the present invention, the strength of such a signal is determined when the delay spread is at least a significant fraction of the transmitted bit time.

BACKGROUND OF THE INVENTION

One of the problems in assessing the signal strength in a mobile, or non-stationary, radio receiver is that the phases of the time-dispersed reflected waves (or echoes) will combine to produce a composite signal. This composite signal, when processed conventionally for any particular measurement interval or sequence of intervals, may yield inaccurate assessments of signal power, due to resultant wild fluctuations in signal strength from moment to moment. This imposes long filtering time constants or long averaging intervals in order to establish a reasonably accurate signal strength assessment.

Other measurement methods have a weakness in that their accuracy is sensitive to the rate of change of the signal envelope, the square root of the signal's instantaneous power, so that slowly-changing instantaneous signal powers impose relatively long time constants or averaging intervals for reasonable measurement accuracy.

In cellular telephony, a system must be able to determine, rapidly and accurately, a representative signal strength on the channel to which it is currently listening in order to properly decide whether the connection should be changed to a channel on another cell site, or to another channel on the current cell site. The process of changing the connection is called a handoff. "Signal strength" for these purposes may be in terms of a certain received voltage level, which may be related, if necessary, to a power.

In the normal course of a cellular telephone call, subscribers may be nearly motionless, as in the case of a handheld portable telephone, or may be moving rapidly, as in the case of a mobile telephone on a freeway. The result is a broad spectrum of rates of change in the received signal's envelope. Under these conditions, a receiver capable of assessing the signal strength more rapidly to the same accuracy, or more accurately in the same time, and in addition be relatively insensitive to the subscriber's motion, would be extremely advantageous.

This invention, then, takes as its object to address these challenges and to realize these and certain other advantages presented below.

SUMMARY OF THE INVENTION

This invention is to be used in receivers employing channel sounding to obtain the channel impulse response. It recognizes that the impulse response contains information which, properly processed, provides a more representative value for the received signal's strength more rapidly and accurately than by simply periodically sampling the signal's envelope.

In accordance with the present invention, there is provided a method of rapid Received Signal Strength Indication (RSSI) of a time-dispersed signal having echoes. There is provided a method of rapid Received Signal Strength Indication (RSSI) of a time-dispersed signal having echoes (where the time dispersal represents a significant fraction or more of the transmitted symbol interval). It comprises a sliding correlation of a received signal against a known sequence or via channel sounding to obtain the time-dispersal function of the communications channel upon which the signal is transmitted, and a summation of the squares of the quadrature components of the energies at relative maxima of the correlations (correlation peaks determined with reference to a threshold level) to integrate the energy defined by the correlation function to determine the energy present among the time-dispersed echoes utilizing the time-dispersal function. Thus, the energy present in the time-dispersed echoes is related to the received signal strength, the RSSI comprises a scalar of the energy present and the scalar comprises a function of the receiver's gain, RSSI determinations during any given interval are less dependent upon the ambulatory velocity of the receiver, and RSSI determinations of equivalent accuracy are obtained more rapidly or more accurate RSSI determinations are obtained per unit time. This depends upon a simplification to the actual physical process of transmitting and receiving a radio signal. In the actual physical case, the energy seen at the receiver is distributed more or less continuously over time. For the present invention we use a simplified model, valid for the cases of interest, which treats the received signal as if it were made up of individual reflections, spaced apart in time. These reflections may also be called rays or echoes.

The method comprises using a known part of the signal, such as a synchronizing sequence, to obtain the time-dispersal function, namely, the impulse response, of the communication channel upon which the signal is transmitted and then determining the energy present among the time-dispersed echoes in order to arrive at the RSSI. Thus, First a correlation function is obtained, which represents the channel impulse response, the correlation being taken between the part of the received signal containing a known training pattern and a copy of the pattern stored in the receiver;

using a threshold, peaks of the correlation function are obtained, each peak being proportionate to the power in one of the rays making up the simplified model of the received signal;

the signal power is taken to be a scaled sum of these ray powers, where the scaling accounts for the receiver's electrical characteristics such as amplifier gain and voltage output, and the time period over which the measurement was taken. This measure of the signal power is called the fast RSSI measurement.

DESCRIPTION OF THE DRAWINGS

Additional objects, features, and advantages of the invention will be more clearly understood and the best mode contemplated for practicing it in its preferred embodiment will be appreciated (by way of unrestricted example) from the following detailed description, taken together with the accompanying drawings in which.

DETAILED DESCRIPTION

The present invention is employed in a cellular radiotelephone system using Time Division Multiple Access (TDMA).

Figure 1:
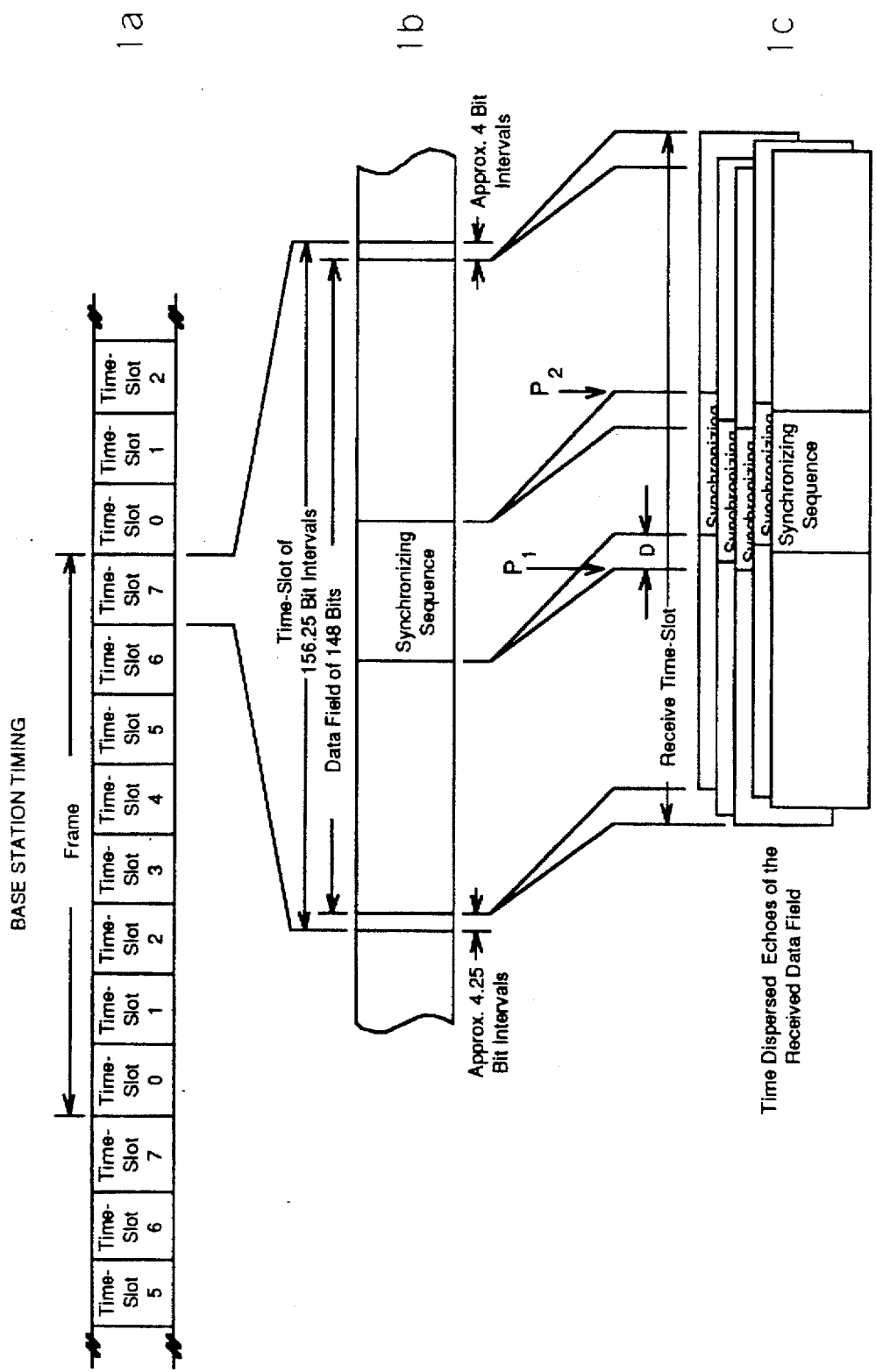
FIG. 1 illustrates an exemplary TDMA signal that is received and assessed according to the preferred embodiment of the present invention.

FIG. 1 illustrates an exemplary TDMA signal that is received and assessed according to the preferred embodiment of the present invention.

As illustrated in FIG. 1a, frames of 4.616 millisecond duration are sequentially transmitted throughout the system. Each frame (Frame) consists of eight time slots (Time Slot 0-7) for ongoing speech or data traffic. An exception is that, on only one carrier frequency duplex pair per cell, one time slot (Time Slot 0) is reserved for system control data, such as access requests and paging.

As illustrated in FIG. 1b, each time slot of 0.577 ms. duration contains 148 bits of information in a 156.25-bit interval, including a sequence upon which receivers may synchronize themselves to the transmission (Synchronizing Sequence), allowing for delayed, time-dispersed arrival of the signal (D) and its echoes at the receiver, as further illustrated in FIG. 1c.

Figure 2:
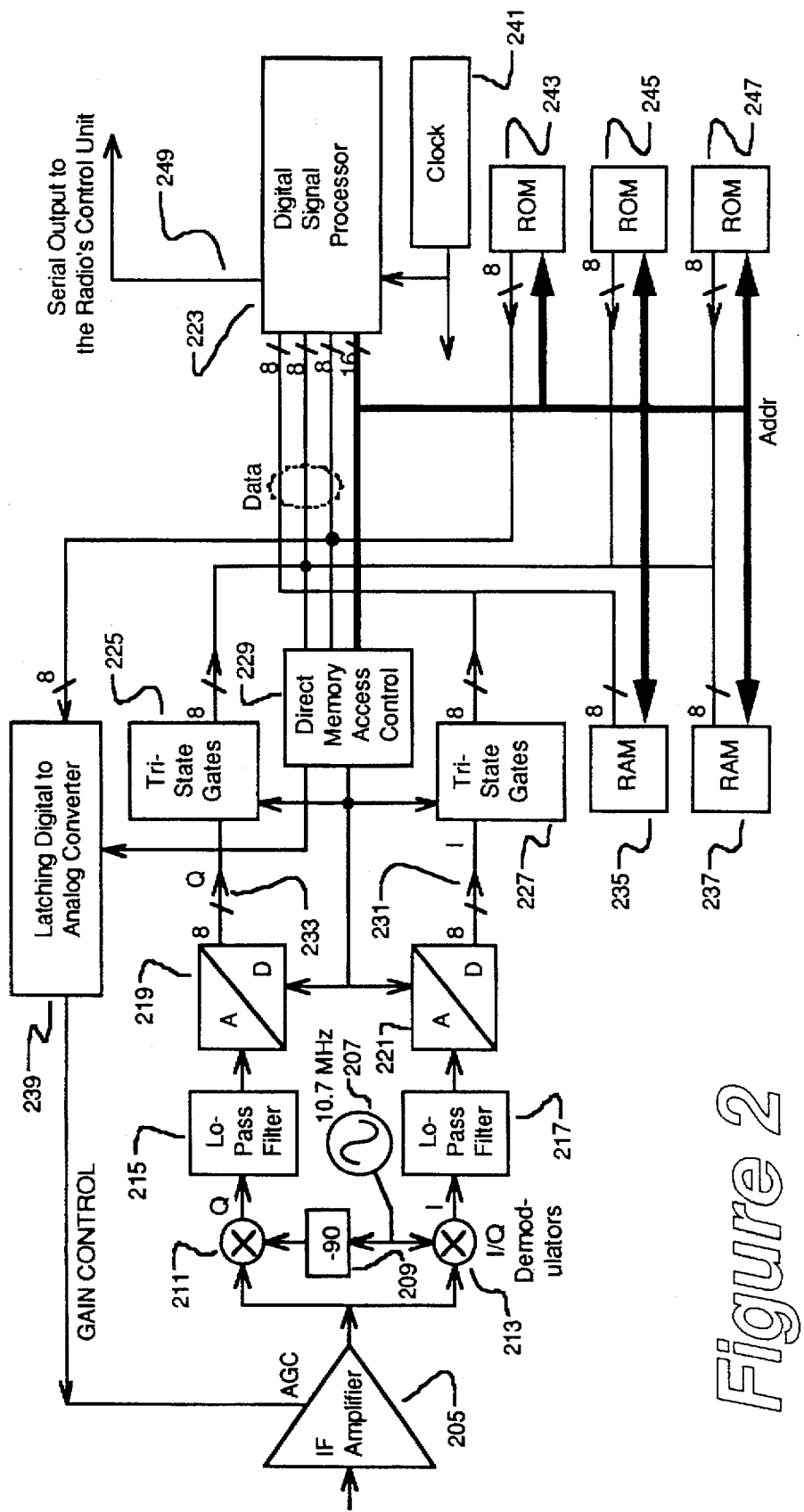
FIG. 2 is a block diagram of the receiver of the preferred embodiment of the present invention.

FIG. 2 is a block diagram of the receiver of the preferred embodiment of the present invention.

The receiver employs conventional radio techniques from the antenna through the mixer and band-pass filter. The mixed and filtered signal is amplified in an intermediate frequency amplifier 205, the gain of which is fixed for the reception of each time-slot at a predetermined value established by a latching digital-to-analog converter 239. The amplified signal is followed by fixed-gain, conventional quadrature detection. The quadrature detector consisting of a local oscillator 207, a 90-degree phase shifter 209 and a pair of demodulators 211 and 213; the local oscillator 207 is phase-locked to the received carrier. The I and Q analog signal components are filtered (217 and 215) and digitized in a pair of fixed gain high speed analog-to-digital converters (A/Ds: 219 and 221) at eight times per symbol interval.

The receiver synchronizes to the system by conventional techniques, and once synchronized, is able to calculate the proper time to begin processing each time slot of the signal. The receiver receives and stores samples of the entire time-slot and later determines the time-dispersal function, namely the channel impulse response, and calculates the fast RSSI as follows.

Throughout the time slot, the DSP 223, through its DMA 229, enables tristate gates (225 and 227) to gate digitized number pairs into M sequential pairs of Random Access Memory locations (RAM: 235 and 237), thus preserving the entire real part of the signal $s(t)=s_i(t)+s_q(t)$, and preserving its inherent time-dispersal characteristics.

Read-Only Memory (ROM: 243, 245 and 247) contains a local replica of the expected synchronizing sequence $r(t)= r_i(t)+r_q(t)$, composed of N sequential pairs of values, as well as containing other memory in which constants and results are stored. We then write this sampled version of the local replica as $$r(n)=r_i(n)+r_q(n), n=1, 2 \ldots, N.$$

Likewise, the sampled version of the received signal is $$s(n)=s_i(n)+s_q(n), n=1, 2 \ldots, M,$$

where M is likely to be greater than or equal to N, inasmuch as the exact location of the synchronizing sequence is unknown to the receiver.

It is instructive at this point to describe what the sampled points r(n) are describing. These points are the sampled version of a time-continuous function which describes a signal which, once launched from the transmitter, is reflected by many objects between transmitter and receiver. Reflecting causes the transmitted signal's energy to arrive over a period of time, determined by how far each echo from each reflecting object had to go to get to the receiver. In the received signal, energy which was transmitted during a signaling symbol time is spread out, or time-dispersed by the reflection process over a time longer than the transmitted symbol time. A model for transmission, now well-known in the literature (for example, "Activities of the COST 207 Working Group on Propagation", R. W. Lorenz, *International Conference on Digital Land Mobile Radio Communications* Jun. 30–Jul. 3, 1987, Venice, Italy), treats the received signal as being composed of a finite number of rays, or echoes, of different arrival times and signal strengths.

Using time-continuous notation now, the signal at the receiver's antenna is $$s(t) = \sum_{i=1}^{L} A_i(t) a_i(t - \tau_i)$$

when L rays are considered. Now we develop what the signal looks like at the receiver just before sampling by the A/D converters. In the case of L=1, a single ray arrives at the receiver and the received signal can be written in the so-called quadrature form $$s(t)=I(t) \cos(\omega_c t)-Q(t) \sin(\omega_c t)$$

where $\omega_c$ is the radian frequency of the RF carrier.

In the "I", or inphase branch, the local oscillator is $\cos(\omega_c t)$, 213, and in the "Q" or quadrature branch, the local oscillator is shifted by −90°, 211. Each picks out its transmitted branch from the received signal according to $$s_i(t)=\{s(t) * \cos(\omega_c t)\}_{LPF};$$

$$s_q(t)=\{s(t) * \sin(\omega_c t)\}_{LPF}$$

where $\{\}_{LPF}$ indicates the bracketed quantity is taken through a low pass filter. Working out the trigonometry, the response to a single ray in the I branch is $$I(t) * \tfrac{1}{2}$$

and similarly in the Q branch is $$-Q(t) * \tfrac{1}{2}.$$

When two rays are involved, it can be shown that on the I branch $$s_i(t) = \frac{I(t)}{2} + \frac{I'(t)}{2} \cos(-\phi) - \frac{Q'(t)}{2} \sin(-\phi)$$

and similarly on the Q branch $$s_q(t) = \frac{-Q(t)}{2} + \frac{I'(t)}{2}\sin(\phi) - \frac{Q'(t)}{2}\cos(\phi)$$

where I'(t) and Q'(t) are the time varying parts of a second ray, and $\phi$ is the phase offset of the second ray's carrier relative to the first ray's carrier. The instantaneous power of the signal s(t) is given by $$p_s(t) = s_i^2(t) + s_q^2(t)$$

which works out to be $$= I^2(t) + Q^2(t) + I'^2(t) + Q'^2(t) + \\ 2(I(t)I'(t) + Q(t)Q'(t))\cos(\phi) \\ 2(I(t)Q'(t) - Q(t)I'(t))\sin(\phi).$$

The last four terms represent rapid variations in the instantaneous power. We would like to get only the first four terms, but there is no way to do this looking at the envelope of the sampled version of s(t) directly. The present invention shows how to get $I^2(t)+Q^2(t)$ for each received ray, which is the power received due to each ray. The sum of these powers, or of something proportional to them, gives a more stable and accurate estimate of signal strength than merely measuring the received signal's envelope.

Figure 3:
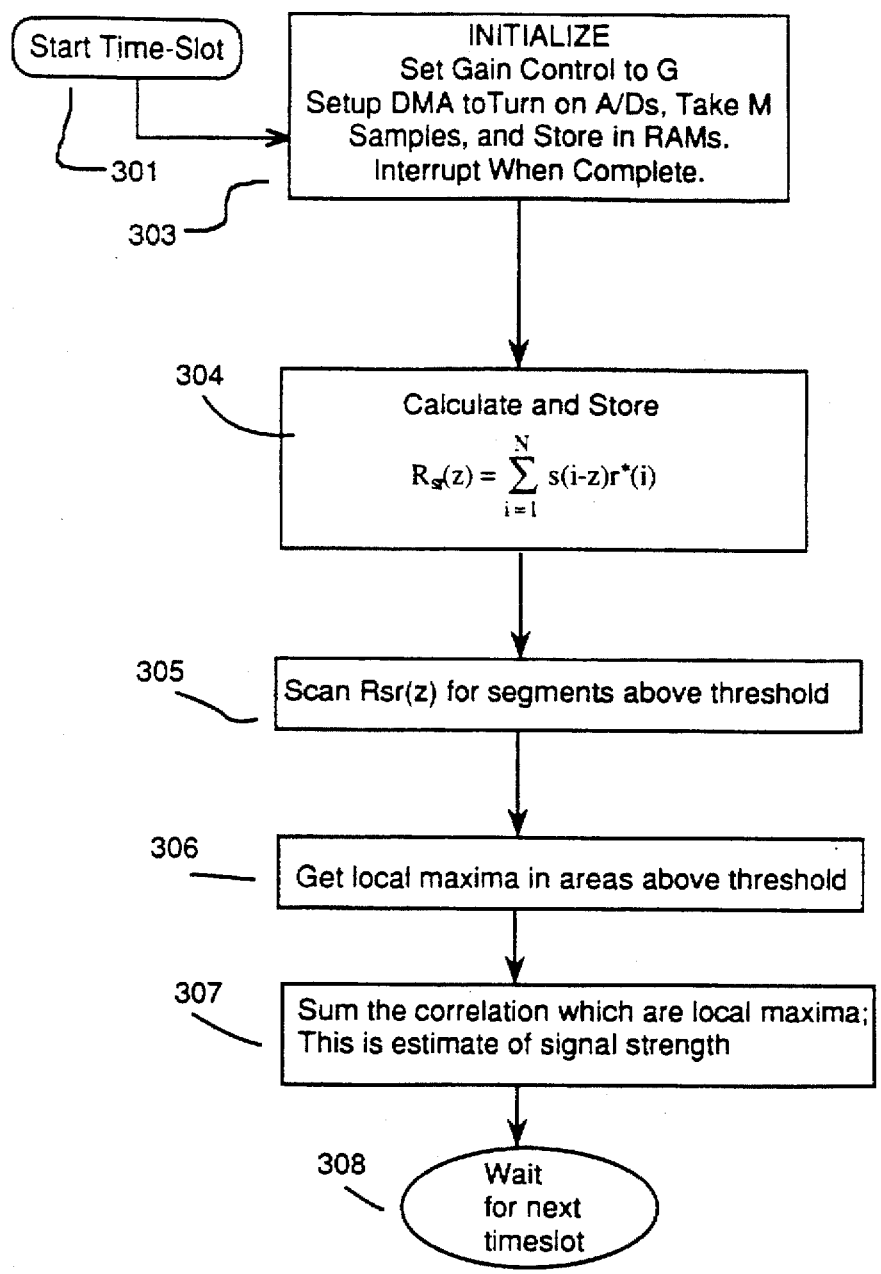
FIG. 3 is an illustration of the process for determining the signal strength indication according to the present invention.

FIG. 3 is an illustration of the process for determining the signal strength indication according to the present invention. The process illustrated at 301 and 303 has just been described above.

Now, the channel impulse response is obtained by calculating the complex correlation function $R_{sr}(z)$ between s(n) and r(n) 304. This is handled mathematically by treating both s(n) and r(n) as complex quantities. The complex correlation is a function of the parameter z, representing the relative shift between s(n) and r(n). The complex correlation function is well known and is given by $$R_{sr}(z) = \sum_{i=1}^{N} s(i-z)r^*(i)$$

where the r*(i) denotes the complex conjugate and the sum is taken over all non-zero samples of the locally stored reference, for each shift z. For those shifts $z=Z_n$ where the correlation is a local maximum, one of the linearly combined rays has aligned with the local reference and the correlation at that point for that ray is given by $$R_{sr}(Z_n) = \alpha \sum_{i=1}^{N} s^2(i) \\ = \alpha \sum_{i=1}^{N} s_i^2(i) + s_q^2(i)$$

where $s^2(t)$ is defined, as is customary for complex numbers, as s(t) s*(t). This is proportional to the energy in one of the rays or echoes. The factor $\alpha$ in the above equations takes into account the expected receiver output voltage level for a given input signal strength and scaling for the use of multiple discrete samples in the calculation. Herein lies the essence of the technique. The process of calculating the complex correlation function essentially reveals the location in time by knowing $Z_n$ for each ray or echo and, most importantly for the present invention, reveals its strength by the magnitude of $R_{sr}(Z_n)$.

There may be several local peaks in the correlation function, and only those above a certain threshold are to be considered 305. When all of the local maxima, above a predetermined threshold, are found 306, the final step is to sum the energies, or voltages squared, or absolute powers, whichever is computationally convenient 307. It is only important that the decision process which is to use the measurement knows which of the measures is being used, which can be included in the scaling factor $\alpha$. This then represents the fast RSSI measurement. Finally, the samples from the next time slot are awaited 308.

When the rate of change of the impulse response is sufficiently slow, compared to the repetition rate of the training sequence used for determining the channel impulse response, the calculated fast RSSI may be taken alone, or even as a predictor value of the strength of the next received data field. When the rate of change of the impulse response is faster, it is appropriate to somehow average or filter the sequence of RSSI values. The process may employ infinite impulse response filtering, running or sliding averages to yield useable results.

It is to be further noted that this method is not limited to burst transmissions, but is equally applicable to the reception of any type of transmission or transmissions in which certain known sequences occur at predictable intervals.

It is also true that the technique in the present invention need not be limited to discrete-time, or sampled, processing. Essentially the same calculations would apply where the correlation is performed by a continuous time device, such as a Surface Acoustic Wave device.

In summary, there has been provided a method of rapid Received Signal Strength Indication (RSSI) of a time-dispersed signal having echoes, where the time dispersal represents a significant fraction or more of the transmitted symbol interval. It comprises producing a complex correlation function between the received signal and a known sequence stored in the receiver. The resulting correlation function is examined in regions above a threshold generated at each new measurement trial for local maxima, each of which is proportional to the energy, and, since the time scale of the signal is known, an individual echo's power. These energies, or powers, or even peak voltages are summed to give an RSSI determination during any given interval less dependent upon the velocity of the receiver than earlier methods. Furthermore, RSSI determinations of equivalent accuracy are obtained more rapidly, or more accurate RSSI determinations are obtained in a given time than simple envelope sampling methods.

There is provided a method of rapid Received Signal Strength Indication (RSSI) of a time-dispersed signal having echoes (where the time dispersal represents a significant fraction or more of the transmitted symbol interval). It comprises a sliding correlation of a received signal against a known sequence or via channel sounding to obtain the time-dispersal function of the communications channel upon which the signal is transmitted and a summation of the squares of the quadrature components of the energies at relative maxima of the correlations (correlation peaks determined with reference to a threshold level) to integrate the energy defined by the correlation function to determine the energy present among the time-dispersed echoes utilizing the time-dispersal function. Thus, the energy present in the time-dispersed echoes is related to the received signal strength, the RSSI comprises a scalar of the energy present and the scalar comprises a function of the receiver's gain, RSSI determinations during any given interval are less dependent upon the ambulatory velocity of the receiver, and RSSI determinations of equivalent accuracy are obtained more rapidly or more accurate RSSI determinations are obtained per unit time.

While the preferred embodiment of the invention has been described and shown, it will be appreciated by those skilled in the art that yet other variations and modifications of this invention may be implemented. These and all other variations and adaptations are expected to fall within the ambit of the appended claims.

What we claim and desire to secure by Letters Patent is:

1. A method of controlling signal reception and processing in a receiver, the method employing received signal strength indications (RSSI's) of time-dispersed signals, the method comprising the steps of:

obtaining from a time-dispersed signal a characteristic time-dispersal function of the communications channel upon which the signal is transmitted;

determining the energy present in the time-dispersed signal from the time-dispersal function obtained; and employing that determination in controlling one of signal reception and processing in said receiver.

2. A method as claimed in claim 1 above, wherein obtaining the time-dispersal function comprises correlating the time-dispersed signal against a known sequence to produce a correlation function having local peaks.

3. A method as claimed in claim 2 above, wherein correlating comprises a sliding correlation of a composite of the time-dispersed signal against the known sequence.

4. A method as claimed in claim 2 above, wherein determining the energy comprises summing the energies of said local peaks having magnitudes greater than a threshold level.

5. A method as claimed in claim 2 above, wherein correlating comprises complexly correlating a quadrature time-dispersed signal against a quadrature reference signal to produce a complex correlation function having local peaks.

6. A method as claimed in claim 5 above, wherein determining the energy comprises summing the squares of said local peaks having a magnitude greater than a threshold level.

7. A method as claimed in claim 1 above, wherein the energy present is proportional to a received signal strength indication of the time-dispersed signal.

8. A method as claimed in claim 7 above, wherein the proportionality is a function of a receiver's gain.

9. A method as claimed in claim 7 above, wherein the RSSI of the time-dispersed signal is employed to gain control a receiver.

10. A method as claimed in claim 1 above, wherein the RSSI is employed to facilitate handoff decisions.

11. A method of controlling signal reception and processing in a receiver, the method employing received signal strength indications (RSSI's) of time-dispersed signals, the method comprising the steps of:

a sliding complex quadrature correlation of a received, time-dispersed signal against a known sequence to obtain a characteristic time-dispersal function of the communications channel upon which the signal is transmitted;

a summation of the squares of the quadrature components of the complex correlation at relative maxima of the correlation to determine the energy present at the relative maxima of such correlation; and employing that determination in the control of one of signal reception and processing in said receiver.

12. A method of controlling signal reception and processing in a receiver, the method employing received signal strength indications of time-dispersed signals, the method comprising:

a sliding complex quadrature correlation of a received, time-dispersal signal against a known sequence to obtain a time-dispersal function of the communications channel upon which the signal is transmitted;

a summation of the squares of the quadrature components of the complex correlation at relative maxima of the correlation, whose correlation peaks determined with reference to a threshold level, to integrate the energy obtained from the correlation function and determine the energy present at the relative maxima of such correlation; and employing that determination in the control of one of signal reception and processing in said receiver.

13. A method of controlling a device, the method employing received signal strength indications (RSSI's) of time-dispersed signals, the method comprising the steps of:

obtaining from a time-dispersed signal a characteristic time-dispersal function of the communications channel upon which the signal is transmitted;

determining the energy present in the time-dispersed signal from the time-dispersal function obtained; and controlling, based on the determined energy present, said device utilized in said cellular radiotelephone system, whereby the determined energy present in the time-dispersed signal is related to a RSSI of the time-dispersed signal.

14. The method as claimed in claim 13 above, wherein said step of controlling said radiotelephone device utilized in said cellular radiotelephone system further comprises the step of controlling a radiotelephone receiver utilized in a cellular radiotelephone system.

15. The method as claimed in claim 14 above, wherein said step of controlling a radiotelephone receiver utilized in said cellular radiotelephone system further comprises the step of controlling automatic gain control (AGC) in said radiotelephone receiver utilized in said cellular radiotelephone system.

* * * * *